(12) United States Patent
Cho et al.

(10) Patent No.: US 8,141,911 B2
(45) Date of Patent: Mar. 27, 2012

(54) PIPE CONNECTION JOINT

(75) Inventors: Jungwon Cho, Daejeon-si (KR); Dongwoo Hwang, Daejeon-si (KR)

(73) Assignee: Halla Climate Control Corporation, Daejeon-Si (KR)

(*) Notice: Subject to any disclaimer, the term of this patent is extended or adjusted under 35 U.S.C. 154(b) by 155 days.

(21) Appl. No.: 12/661,415

(22) Filed: Mar. 16, 2010

(65) Prior Publication Data
US 2010/0237615 A1 Sep. 23, 2010

(30) Foreign Application Priority Data

Mar. 19, 2009 (KR) .................. 10-2009-0023417
Mar. 10, 2010 (KR) .................. 10-2010-0021190

(51) Int. Cl.
*F16L 41/00* (2006.01)
(52) U.S. Cl. ...................................... 285/208; 285/179
(58) Field of Classification Search .............. 285/208, 285/124.3, 124.4, 124.2, 179, 382.4, 382.5, 285/234
See application file for complete search history.

(56) References Cited

U.S. PATENT DOCUMENTS

| | | | | | |
|---|---|---|---|---|---|
| 2,092,358 | A | * | 9/1937 | Robertson | 285/213 |
| 4,770,447 | A | * | 9/1988 | Umehara | 285/189 |
| 5,853,201 | A | * | 12/1998 | Izumi et al. | 285/179 |
| 6,206,437 | B1 | * | 3/2001 | Humphreys | 285/353 |
| 6,682,100 | B2 | * | 1/2004 | Wood et al. | 285/26 |
| 7,380,327 | B2 | * | 6/2008 | Snow et al. | 29/521 |
| 7,415,765 | B2 | * | 8/2008 | Ozawa | 29/890.149 |

FOREIGN PATENT DOCUMENTS

JP 7012283 A 1/1995
JP 2002130561 A 5/2002

* cited by examiner

*Primary Examiner* — Aaron Dunwoody
(74) *Attorney, Agent, or Firm* — Fulbright & Jaworski L.L.P.

(57) ABSTRACT

A pipe connection joint comprising a linear slant portion formed on a pipe joining hole of a flange and a pipe-expanded portion expandably formed on a pipe. The pipe-expanded portion is joined to the pipe joining hole, along the linear slant portion. A pipe connection joint with an inwardly-curved surface portion of the pipe bent by micro R bending technology is also disclosed.

9 Claims, 9 Drawing Sheets

Prior Art

Prior Art

US 8,141,911 B2

PIPE CONNECTION JOINT

RELATED APPLICATIONS

This application claims priority from Korean Patent Application No. 2009-23417 filed Mar. 19, 2009, and from Korean Patent Application No. 2010-21190 filed Mar. 10, 2010.

BACKGROUND OF THE INVENTION

1. Field of the Invention

The present invention relates to a pipe connection joint, and more particularly, to a pipe connection joint that includes a linear slant portion formed on a pipe joining hole of a flange and a pipe-expanded portion expandably formed on a pipe, which is joined to the pipe joining hole, along the linear slant portion, thereby providing a sufficient joining strength due to an increase of a contact area between the flange and the pipe, securing a firm fixation, preventing rotation of the pipe and guaranteeing communalization. In addition, the present invention relates to a pipe connection joint that is provided with an inwardly-curved surface portion of the pipe bent by micro R bending technology to minimize a bending distance to thereby allow an easy product design in a restricted space and further provided with a sealing member seating portion formed by the pipe-expanded portion of the pipe without needing additional process for seating of a sealing member to thereby minimize machining and reduce manufacturing expenses.

2. Background Art

In general, a refrigeration cycle for vehicles generally connects a compressor, a condenser, an expansion valve and an evaporator through refrigerant pipes in consecutive order to form a refrigerant circuit, such that the refrigeration cycle cools the inside of the vehicles through circulating refrigerant.

In this instance, in order to increase joining force between the refrigerant pipes and the above-mentioned components, pipe connection joints are mounted on end portions of the refrigerant pipes.

The pipe connection joints are used not only for joining the refrigerant pipes to the components in the refrigeration cycle but also for joining pipes to objects to be connected in overall industry.

Pipe connection joints according to prior arts are illustrated in FIGS. 1 and 2.

First, the pipe connection joint 10 illustrated in FIG. 1 includes a flange 11 formed through cutting work and a pipe connection portion 12 formed on a lower face of the flange 11 through cutting work.

Furthermore, the pipe connection joint 10 further includes a pipe 13 welded on a side of the flange 11 in such a way as to communicate with the pipe connection portion 12.

Accordingly, when the flange 11 is joined to a connection object 1 through a bolt 15, the pipe connection portion 12 of the flange 11 is connected to a passage 2 of the connection object 1.

As described above, the pipe 13 can be easily assembled to the connection object 1 via the pipe connection joint 10, and it prevents a leakage of fluid.

However, the pipe connection joint 10 needs expensive materials and additional welding and machining as the pipe 13 must be welded on the side of the flange 11, and hence, the overall cost of manufacturing increases.

Moreover, the pipe connection joint 10 according to another example illustrated in FIG. 2 includes a pipe 35 bent in an L-shape using micro R bending technology, a flange 30 having a pipe coupling hole 31 formed on a side of the flange 30 for inserting the pipe 35 thereinto, and an O-bead 36 molded on the pipe projecting from the other side of the flange 30, the O-bead 36 being seated on a groove 32 formed on the side of the flange 30.

Additionally, a seating hole 37 is formed on an end portion of the pipe 35 for seating an O-ring 38 thereon.

Accordingly, when the flange 30 is joined to the connection object 1 through a bolt 39, the pipe projecting from the flange 30 is connected to a passage 2 of the connection object 1, and a leakage can be prevented via the O-ring 38.

Furthermore, a pair of reinforcing ribs 33 projectingly formed on one side of the flange 30 in order to reinforce joining force between the flange 30 and the pipe 35. In other words, the reinforcing ribs 33 prevents rotation of the pipe 35 while supporting both sides of the pipe 35 to thereby increase the joining force between the flange 30 and the pipe 35.

Since the pipe 35 is bent through the micro R bending technology, the bent portion of the pipe 35 can be partially received in one side of the flange 30 to thereby reduce a bending distance L1. However, the prior art has a problem in that it is difficult to commonalize it due to the reinforcing ribs 33, which are additionally used in portions requiring high intensity (joining strength between the flange and the pipe), such as vehicle engines.

In other words, a mounting direction of the pipe 35 can be changed according to positions of components mounted inside an engine room of a vehicle, but the mounting direction (bending direction) of the pipe 35 on the flange 30 cannot be changed since the reinforcing ribs 33 support both sides of the pipe 35, and finally, various kinds of flanges 30 must be manufactured in correspondence with various mounting directions of the pipe 35, and hence, it is difficult to commonalize the pipe 35.

As described above, since the flange 30 includes a hole 34, on which an inwardly bent portion of the pipe 35 is seated, and the reinforcing ribs 33, different kinds of joint flanges must be designed according to a piping design of the pipe 35, and hence, it is difficult to commonalize it.

In addition, the flange 30 has the hole 34 on which the inwardly bent portion of the pipe 35 is seated and the groove 32 on which the O-bead 36 is seated, and thence, the number of processes and expenses are increased.

Furthermore, the hole 34 and the groove 32 respectively formed for seating the inwardly bent portion 34 and the O-bead thereon reduce the joining force between the pipe 35 and the flange 30 to thereby deteriorate fixing force of the pipe 35.

SUMMARY OF THE INVENTION

Accordingly, the present invention has been made to solve the above-mentioned problems occurring in the prior arts, and it is an object of the present invention to provide a pipe connection joint that includes a linear slant portion formed on a pipe joining hole of a flange and a pipe-expanded portion expandably formed on a pipe, which is joined to the pipe joining hole, along the linear slant portion, thereby providing a sufficient joining strength due to an increase of a contact area between the flange and the pipe, securing a firm fixation, preventing rotation of the pipe and guaranteeing communalization. It is another object of the present invention to provide a pipe connection joint that is provided with an inwardly-curved surface portion of the pipe bent by micro R bending technology to minimize a bending distance to thereby allow an easy product design in a restricted space and further provided with a sealing member seating portion formed by the pipe-expanded portion of the pipe without needing additional process for seating of a sealing member to thereby minimize machining and reduce manufacturing expenses.

To accomplish the above object, according to the present invention, there is provided a pipe connection joint comprising: a flange joined to a connection object having a passage for a flow of fluid and a pipe joining hole having a pipe joining hole, the pipe joining hole having a linear slant portion widening toward the connection object; and a pipe bent in an L-shape and inserted into the pipe joining hole of the flange, the pipe having a pipe-expanded portion expandably formed along the linear slant portion to thereby be closely joined to the linear slant portion of the pipe joining hole, the pipe being connected to the passage of the connection object in a state where a sealing member is seated on an outer surface of one end portion of the pipe.

The pipe connection joint according to the present invention includes: the pipe joining hole formed on the flange and having an arc-shaped portion and the linear slant portion; and the pipe-expanded portion expandably formed on the pipe, which is compressively joined to the pipe joining hole through cocking work, along the linear slant portion, such that a joined surface between the flange and the pipe joining hole increases to thereby enhance fixing force.

Furthermore, a bent inwardly-curved surface portion of the pipe is closely fixed to the arc-shaped portion of the pipe joining hole and the pipe is expandably fixed to the linear slant portion, such that the joined surface between the flange and the pipe joining hole increases to thereby secure a sufficient joining strength, whereby it can prevent rotation of the pipe even though it is mounted at a high-intensity requiring portion, such as engines of vehicles, due to its firm fixation.

Because the pipe is closely fixed to one side of the flange without needing to form the groove on the side of the flange where the pipe is seated and a mounting direction of the pipe can be freely regulated before the cocking work of the pipe into the pipe joining hole of the flange, the flange can be commonalize even though the bending direction (mounting direction) of the pipe is changed, whereby manufacturing expenses can be reduced.

Moreover, since the sealing member seating portion is formed by the pipe-expanded portion, additional process for seating of the sealing member is not needed and the pipe is joined to the linear slant portion of the pipe joining hole through the cocking work, whereby it can minimize machining and reduce manufacturing expenses.

Additionally, stepped portions of a predetermined depth are formed on the inner circumferential surface of the pipe joining hole and an outer surface of the pipe-expanded portion is compressed to the inside of the stepped portions to fill the inside of the stepped portions, such that the joining strength between the pipe and the flange is increased, whereby it can prevent the rotation of the pipe better.

Furthermore, the stepped portions are gradually reduced in depth toward the end portion of the linear slant portion, such that the sealing member seating portion can be easily molded and the processing accuracy of the sealing member seating portion can be easily secured.

Moreover, the pipe-expanded portion is formed in a non-circular shape or rotation-preventing ribs for supporting both sides of the pipe are formed on one side of the flange, whereby the rotation of the pipe can be prevented much better.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENT

Reference will be now made in detail to the preferred embodiment of the present invention with reference to the attached drawings.

Figure 1:
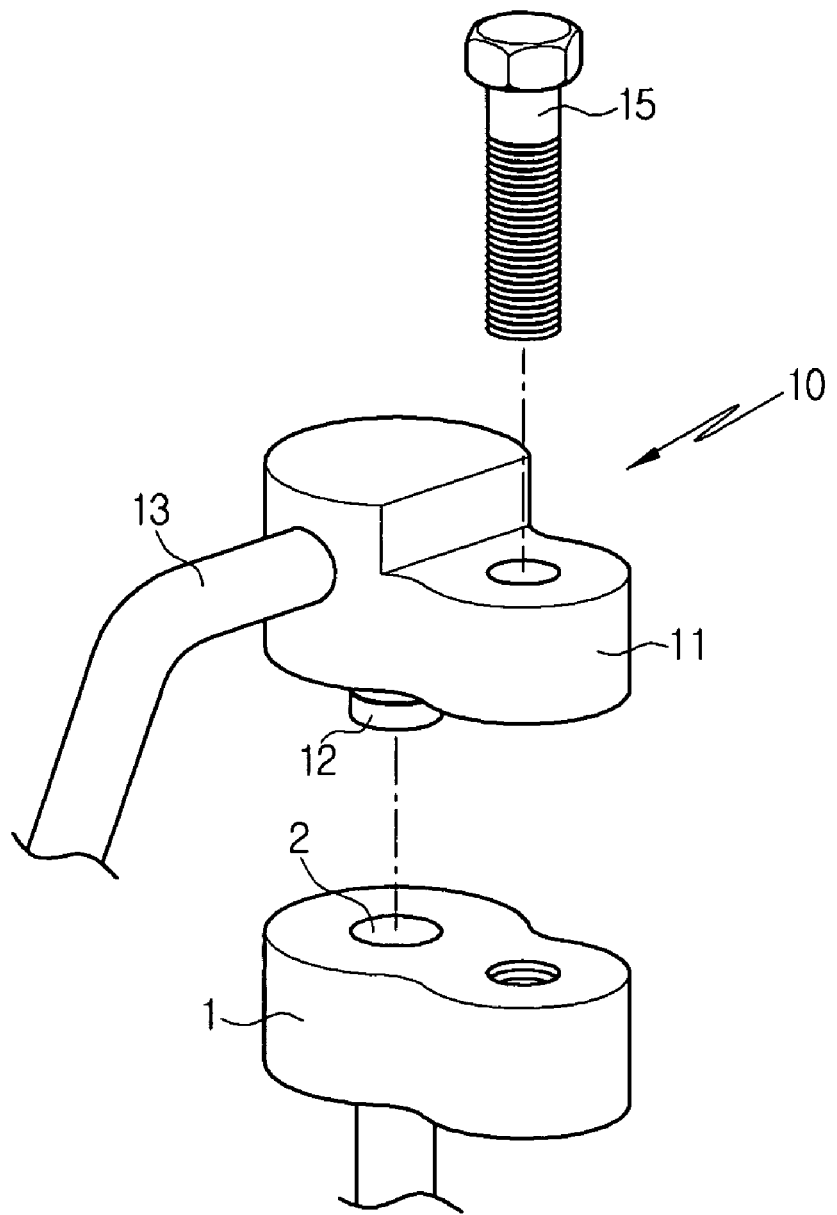
FIG. 1 is an exploded perspective view of a pipe connection joint according to a prior art.
Figure 2:
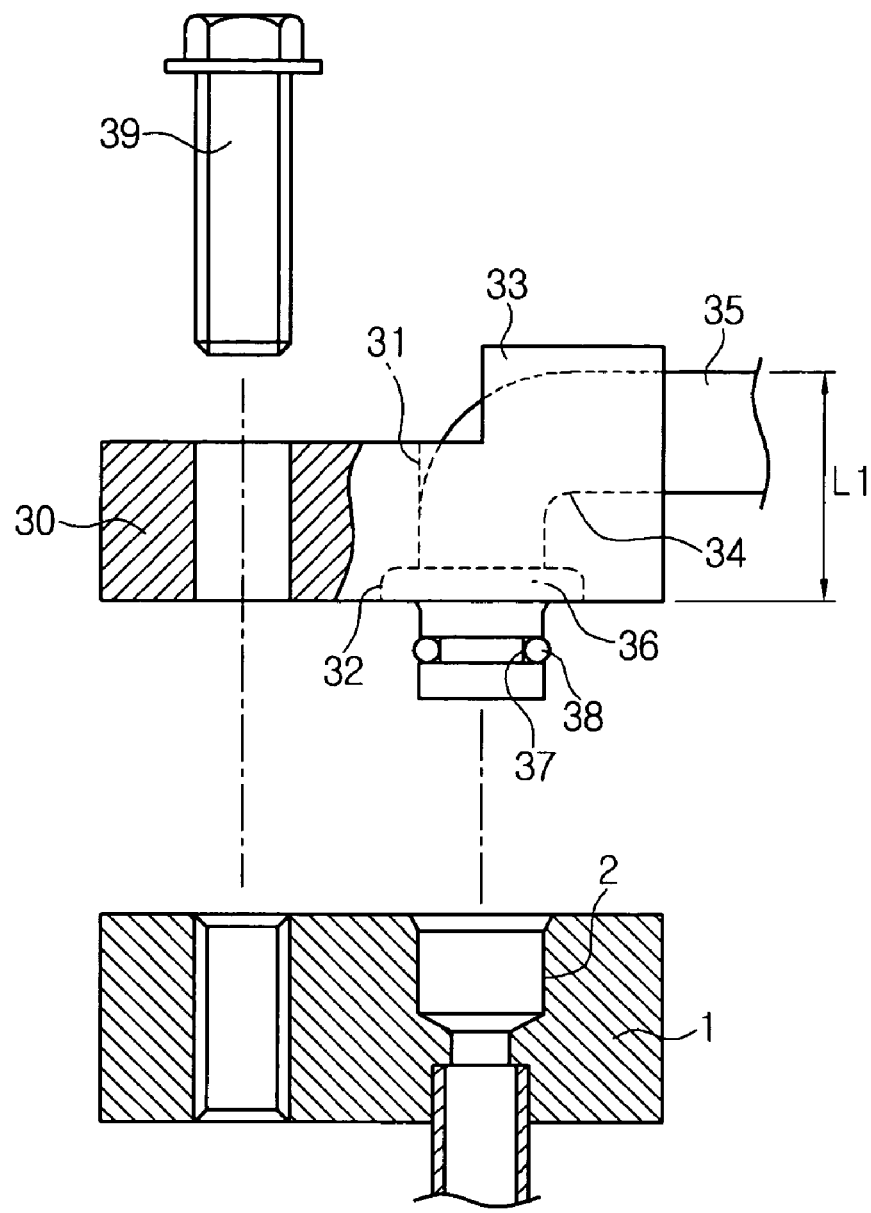
FIG. 2 is an exploded perspective view of another example of the pipe connection joint according to a further prior art.
Figure 3:
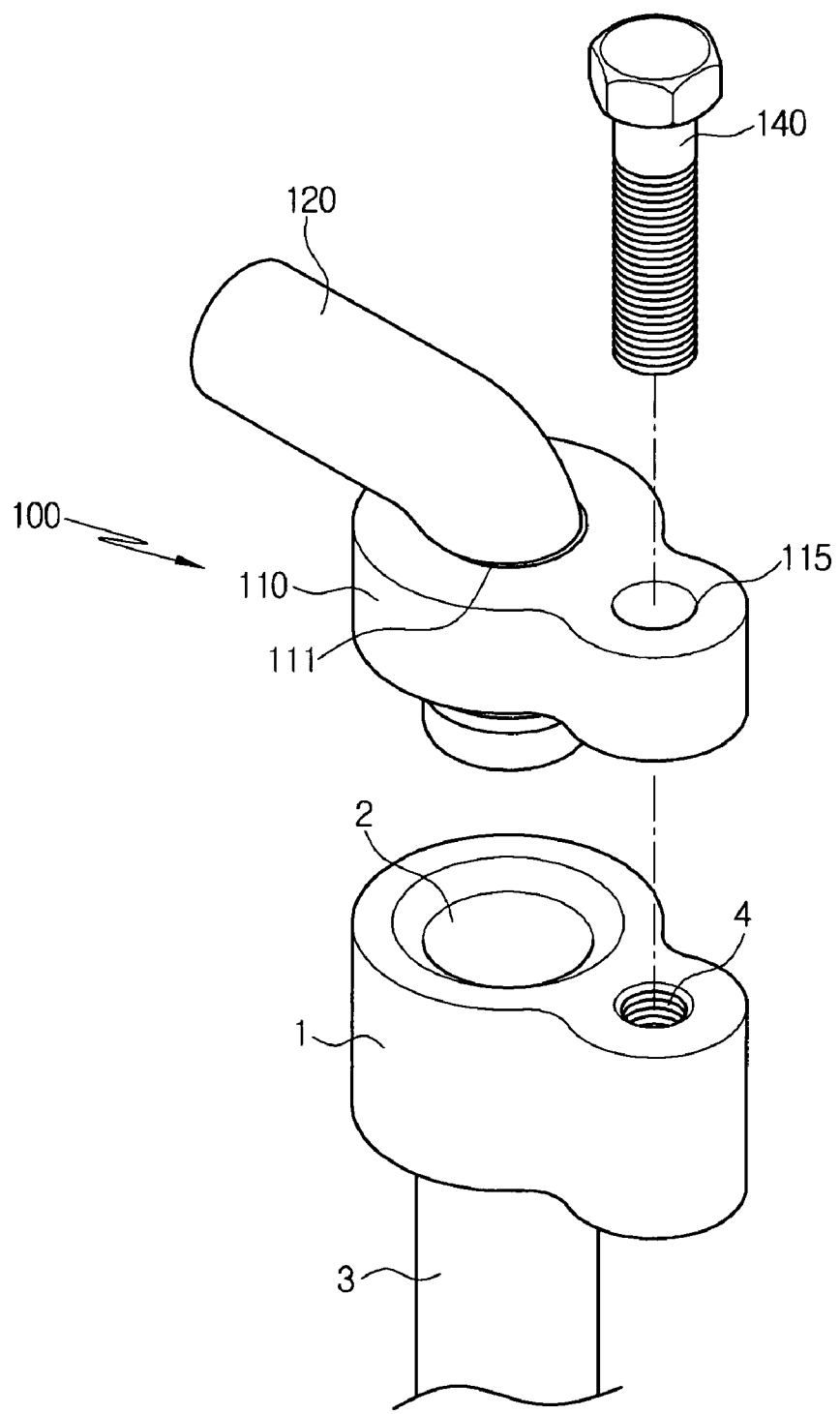
FIG. 3 is a perspective view of a pipe connection joint according to the present invention.
Figure 4:
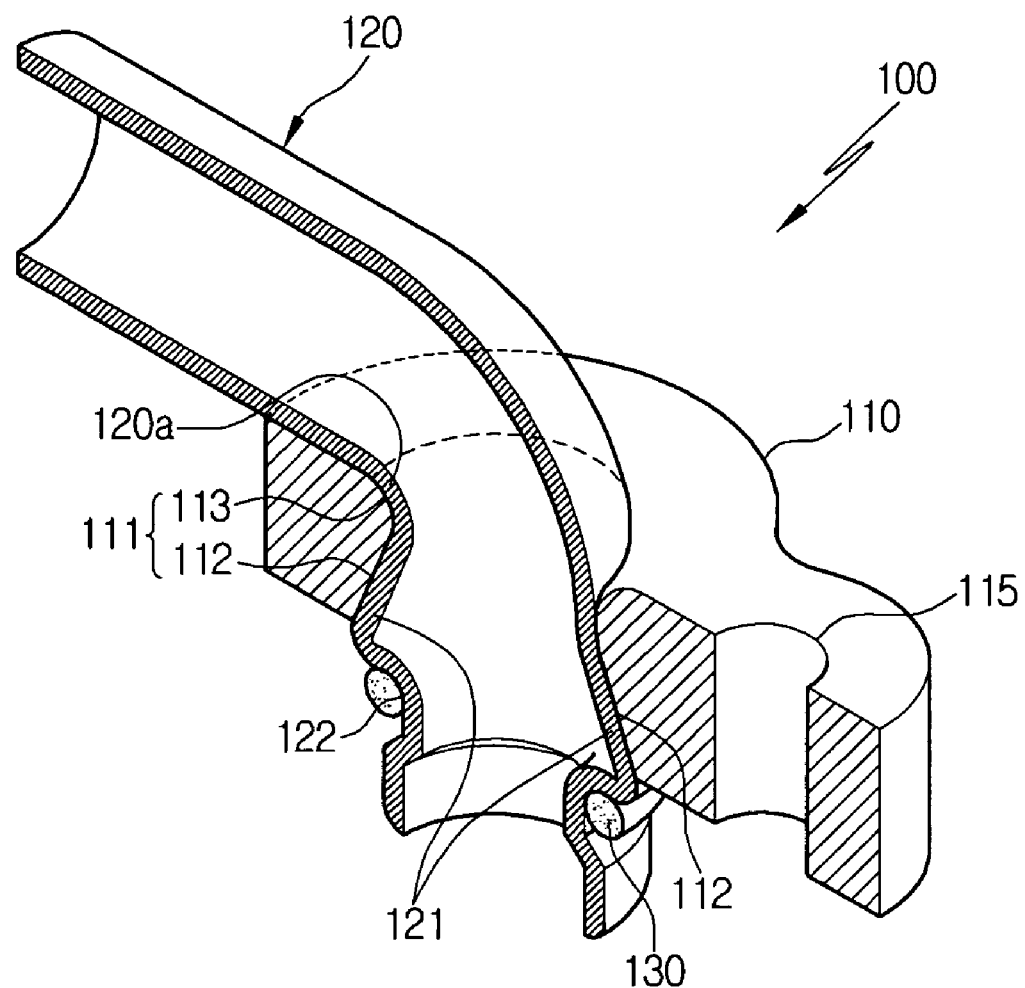
FIG. 4 is a sectionally perspective view of the pipe connection joint according to the present invention.
Figure 5:
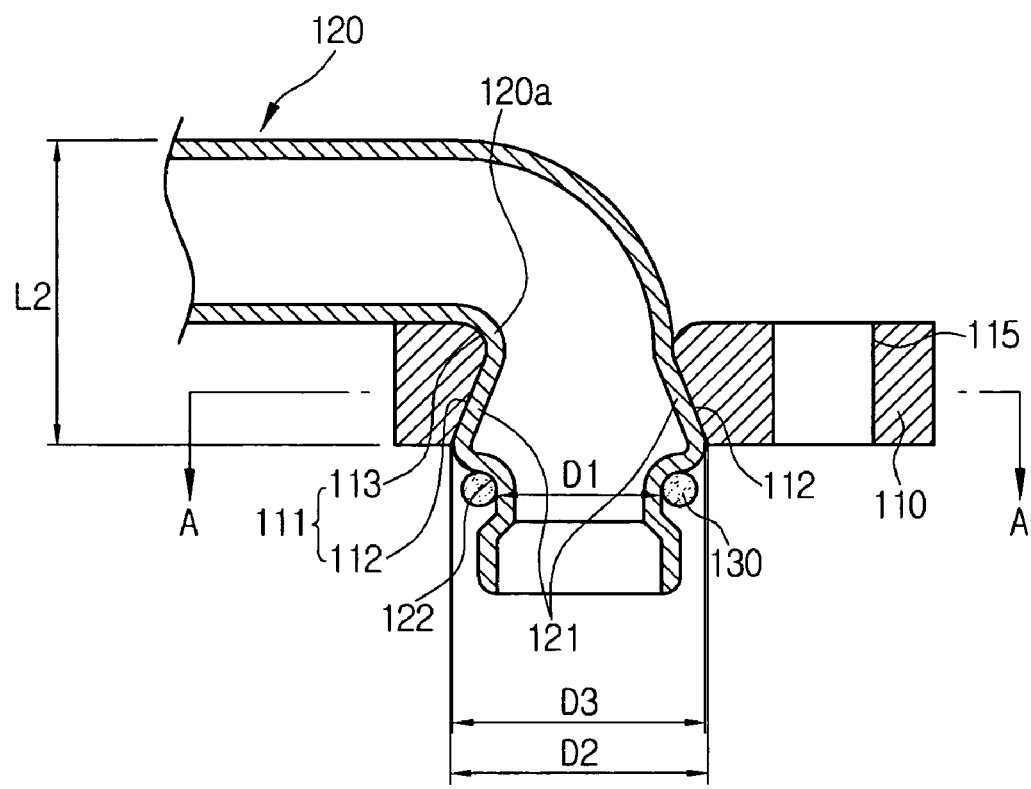
FIG. 5 is a sectional view of the pipe connection joint according to the present invention.
Figure 5:
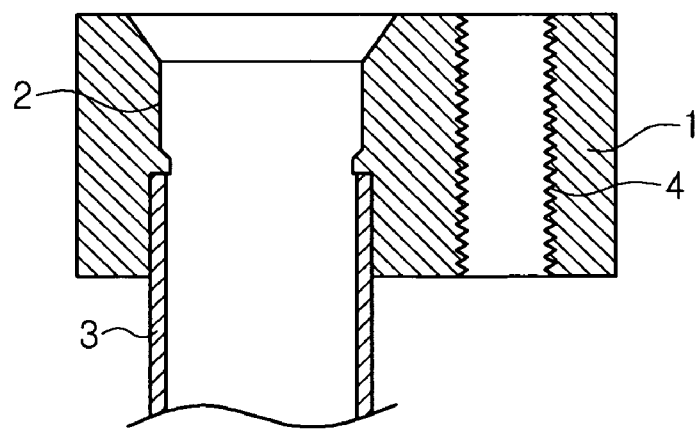
Figure 6:
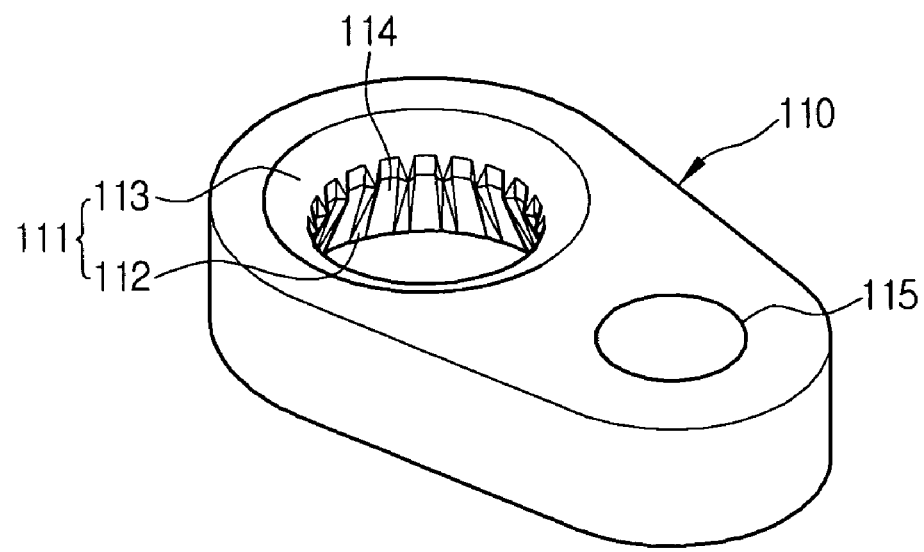
FIG. 6 is a perspective view showing a state where stepped portions are formed on a pipe joining hole in the pipe connection joint according to the present invention.
Figure 7:
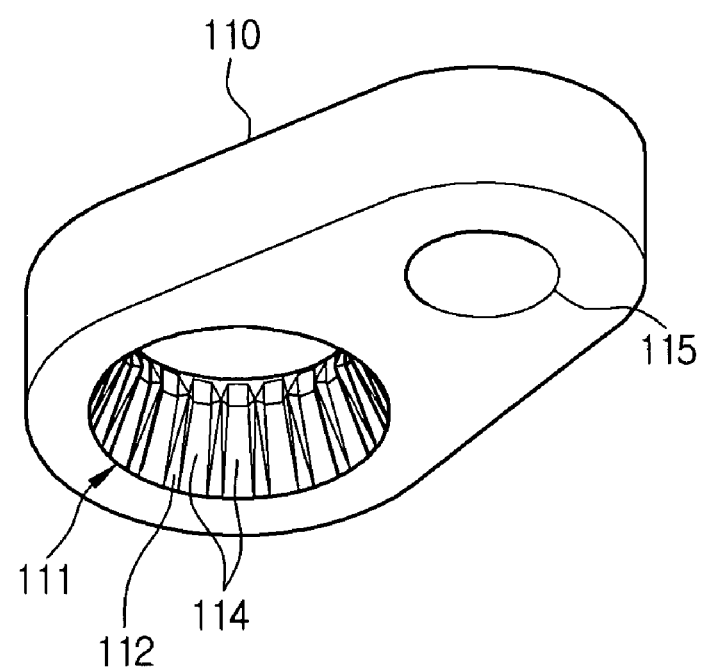
FIG. 7 is a perspective view of a flange of FIG. 6 viewed from the bottom.
Figure 8:
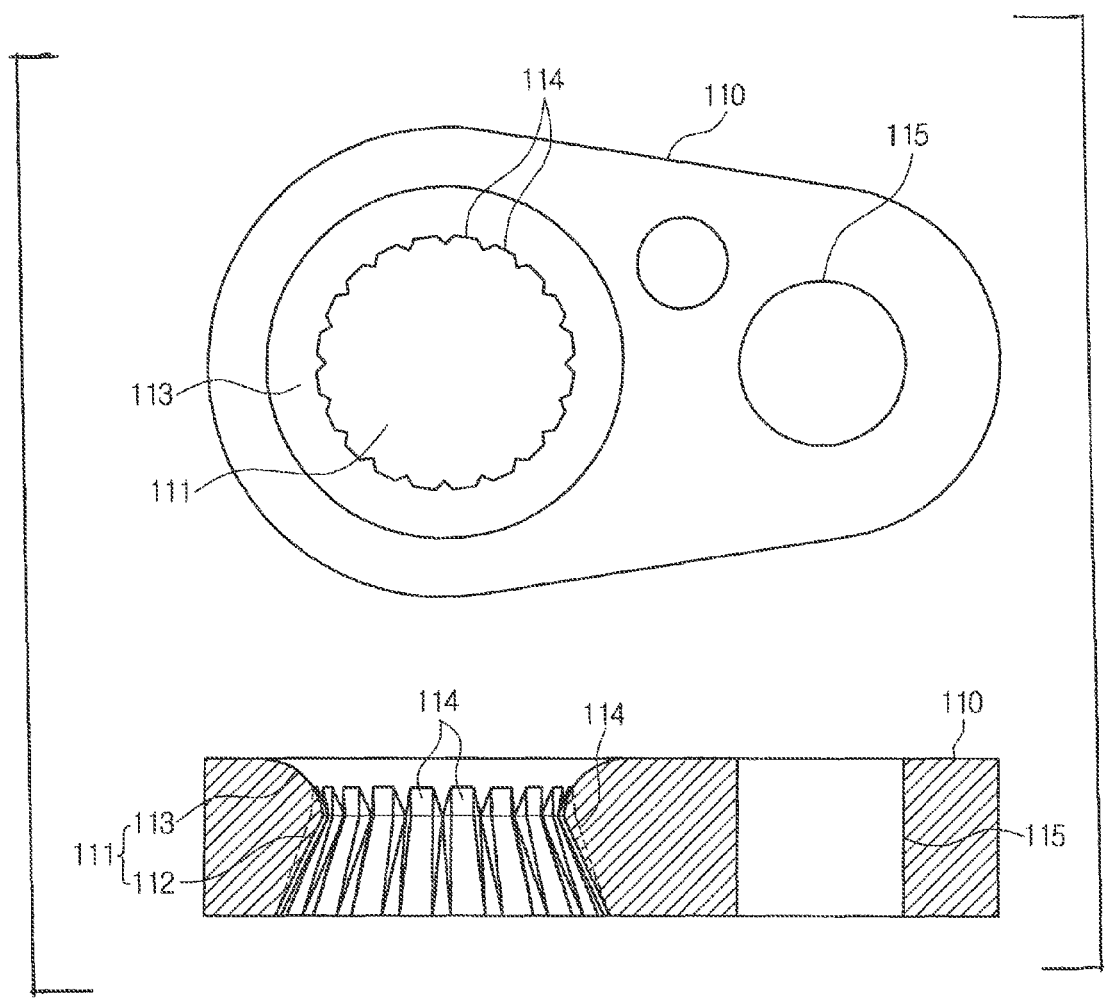
FIG. 8 is a plan view and a sectional view of the flange of FIG. 6.
Figure 9:
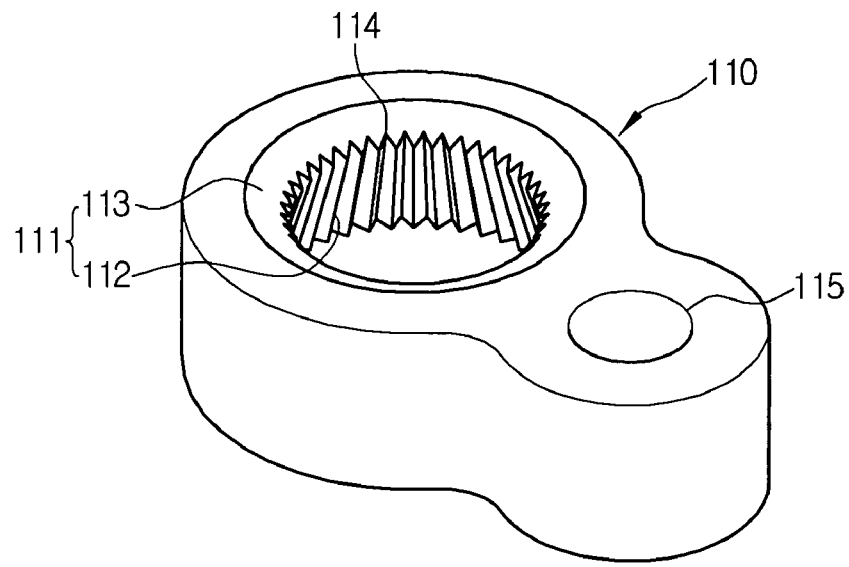
FIG. 9 is a perspective view showing another form of the stepped portions formed on the pipe joining hole of the pipe connection joint according to the present invention.
Figure 10:
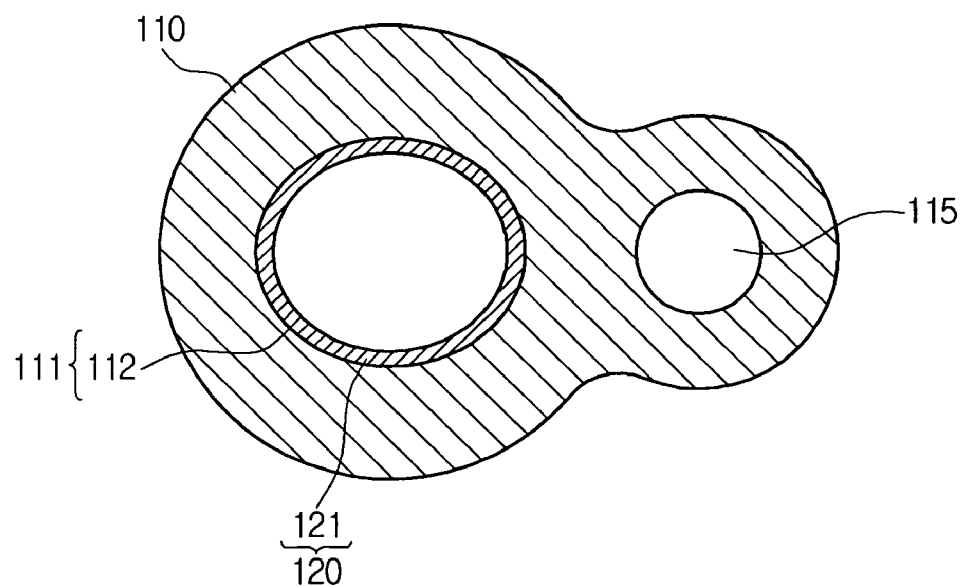
FIG. 10 is a sectional view taken along the line A-A of FIG. 5, showing a case that a linear slant portion and a pipe-expanded portion are formed in a non-circular shape.
Figure 11:
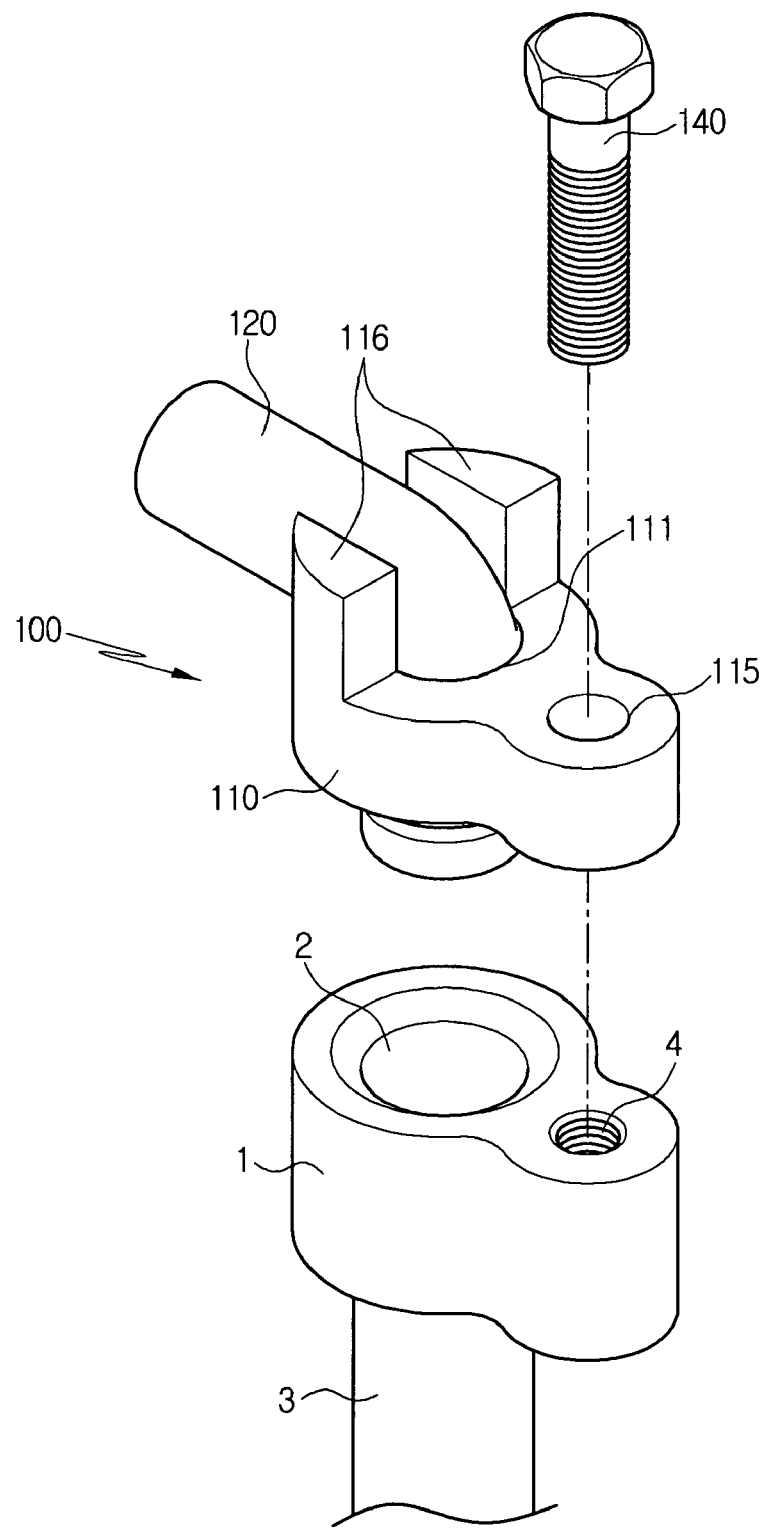
FIG. 11 is a perspective view showing a case that rotation-preventing ribs are formed on one side of the flange of the pipe connection joint according to the present invention.

FIG. 3 is a perspective view of a pipe connection joint according to the present invention, FIG. 4 is a sectionally perspective view of the pipe connection joint, FIG. 5 is a sectional view of the pipe connection joint, FIG. 6 is a perspective view showing a state where a stepped portion is formed on a pipe joining hole in the pipe connection joint, FIG. 7 is a perspective view of a flange of FIG. 6 viewed from the bottom, FIG. 8 is a plan view and a sectional view of the flange of FIG. 6, FIG. 9 is a perspective view showing another form of the stepped portion formed on the pipe joining hole of the pipe connection joint, FIG. 10 is a sectional view taken along the line A-A of FIG. 5, showing a case that a linear slant portion and a pipe-expanded portion are formed in a non-circular shape, and FIG. 11 is a perspective view showing a case that rotation-preventing ribs are formed on one side of the flange of the pipe connection joint according to the present invention.

As shown in the drawings, the pipe connection joint 100 according to the present invention can be mounted at an end portion of a refrigerant pipe for the purpose of joining the refrigerant pipe with components when the components, namely, a compressor, a condenser, an expansion valve and an evaporator, are connected with one another through refrigerant pipes in consecutive order, and moreover, can be used for joining pipes to a connection object 1 in overall industry.

The pipe connection joint 100 includes: a flange 110 joined to the connection object 1 having a passage 2 for a flow of fluid and a pipe joining hole 111 penetratingly formed therein; and a pipe 120 bent in an L-shape and inserted into the pipe joining hole 111 of the flange 110.

The connection object 1 includes another pipe 3 inserted and joined to one side of the passage 2 thereof and a bolt tap 4 spaced apart from the passage 2 at a predetermined interval for the purpose of a bolt joining between the connection object 1 and the flange 110.

Furthermore, the flange 110 includes the pipe joining hole 111 penetratingly formed therein in correspondence with the passage 2 of the connection object 1 and a bolt hole 115 formed corresponding to the bolt tap 4 of the connection object 1, the bolt hole 115 being spaced apart from the pipe joining hole 111 at a predetermined interval.

Therefore, when a bolt 140 is inserted into the bolt hole 115 of the flange 110 and screw-coupled to the bolt tap 4 of the connection object 1, the flange 110 can be easily joined to the connection object 1.

In the meantime, it is preferable that the flange 110 is designed and manufactured as lightweight and inexpensive flange 110 by being manufactured through aluminum diecasting (Al-diecasting), and can be manufactured through one of various manufacturing methods.

Furthermore, a linear slant portion 112 widening toward the connection object 1 is formed on the pipe joining hole 111 of the flange 110.

Here, the linear slant portion 112 is not formed on the entire inner circumferential surface of the pipe joining hole 111 but formed only on a portion corresponding to a pipe-expanded portion 121 of the pipe 120, which will be described later, in an expanded form.

The pipe joining hole 111 includes: an arc-shaped portion 113 formed on one end portion thereof with a predetermined radius in such a way as to be in contact with an inwardly-curved surface portion 120a; and the linear slant portion 112 extending from the arc-shaped portion 113 to the other end portion thereof and being inclined at a predetermined angle in such a way as to be in contact with the pipe-expanded portion 121 of the pipe 120.

Here, the linear slant portion 112 is started from an end portion of the arc-shaped portion 113.

Moreover, the pipe 120 is bent in an L-shape using micro R bending technology, and the bent portion of the pipe 120 is inserted and joined into the pipe joining hole 111.

As described above, since the pipe 120 is bent through the micro R bending technology, it can minimize a bending distance L2 between the flange 110 and the pipe 120, whereby a product design can be achieved easily in a restricted space like an engine room of a vehicle.

Additionally, the pipe 120 includes the pipe-expanded portion 121 expandably formed along the linear slant portion 112 to thereby be closely joined to the linear slant portion 112 of the pipe joining hole 111.

In other words, an end portion of the pipe 120 bent in an L-shape is joined to the pipe 120 in a state where it is inserted into the pipe joining hole 111 through cocking work. In this instance, the end portion of the pipe 120 inserted into the pipe joining hole 111 is expanded by a press during the cocking work, such that the pipe-expanded portion 121 of a tapered form, which is compressed to the linear slant portion 112 of the pipe joining hole 111, is formed on the pipe 120.

As described above, the pipe 120 is joined to the pipe joining hole 111 of the flange 110 having the arc-shaped portion 113 and the linear slant portion 112, such that a joined surface between the pipe and the flange joining hole 111 is increased to thereby increase fixing force.

Moreover, the inwardly-curved surface portion 120a of the pipe 120 is closely fixed to the arc-shaped portion 113 and the pipe 120 is expandably fixed to the linear slant portion 112, such that a contact area between the pipe joining hole 111 of the flange 110 and the pipe 120 is increased to thereby ensure a sufficient joining force, whereby it can prevent rotation of the pipe 120 even though it is mounted at a high-intensity requiring portion, such as engines of vehicles, due to its firm fixation.

Meanwhile, since there is no additional groove on a side of the flange 110 for seating the pipe 120 thereon, the side of the flange 110 is formed flat without stepped portions between the portion where the pipe 120 is seated and a portion where the pipe 120 is not seated.

As described above, because the pipe 120 is closely fixed to one side of the flange 110 without needing to form the groove on the side of the flange 110 where the pipe 120 is seated and a mounting direction of the pipe 120 can be freely regulated before the cocking work of the pipe 120 into the pipe joining hole 111 of the flange 110, the flange 110 can be commonalize even though the bending direction (mounting direction) of the pipe 120 is changed, whereby manufacturing expenses can be reduced.

Furthermore, an end portion of the pipe-expanded portion 121 of the pipe 120 projectingly formed over the side of the flange 110, and in this instance, a sealing member seating portion 122 for seating a sealing member 130 thereon is formed on an end portion of the pipe-expanded portion 121 in an inwardly shrunk manner.

That is, the pipe 120 is molded on the pipe 120, and at the same time, the sealing member seating portion 122 is molded by the end portion of the pipe-expanded portion 121 shrunk inwardly. Thus, since the sealing member seating portion 122 is formed by the pipe-expanded portion 121, an O-bead molding process for forming an O-ring seating portion carried out in the prior arts can be omitted.

Moreover, the pipe-expanded portion 121 of the pipe 120 is formed between an end portion of the inwardly-curved surface portion 120a of the pipe 120 bent in an L-shape and the sealing member 130.

Here, it is preferable that the sealing member 130 is an O-ring, but any one of things to prevent a leakage of fluid, for instance, slim washers, can be used as the sealing member 130.

Additionally, the sealing member seating portion 122 is formed on the end portion of the pipe-expanded portion 121 by the pipe-expanded portion 121, but the sealing member 130 can be seated thereon in such a way that a groove (not shown) is formed on the end portion of the pipe 120.

In the meantime, an outer diameter D1 of the sealing member seating portion 122 is equal to or smaller than an inner diameter D2 of an end portion of the pipe joining portion 111 (an end portion of the linear slant portion) adjacent to the sealing member seating portion 122, and an outer diameter D3 of an end portion of the pipe-expanded portion 121 of the pipe 120 adjacent to the sealing member 130 is equal to or smaller than the inner diameter D2 of the end portion of the pipe joining hole 111 adjacent to the sealing member seating portion 122.

If the outer diameter D1 of the sealing member seating portion 122 or the outer diameter D3 of the end portion of the pipe-expanded portion 121 adjacent to the sealing member 130 is larger than the inner diameter D2 of the end portion of the pipe joining hole 111, a connection structure becomes complicated when the flange 110 and the connection object 1 are joined with each other.

As described above, since the sealing member seating portion 122 is formed by the pipe-expanded portion 121, additional process for seating of the sealing member 130 is not needed and the pipe 120 is joined to the linear slant portion 112 of the pipe joining hole 111 through the cocking work, whereby it can minimize machining and reduce manufacturing expenses.

In addition, FIGS. 6 to 11 illustrate various examples for preventing the rotation of the pipe 120 joined to the pipe joining hole 111 of the flange 110, wherein FIGS. 6 to 9 illustrate stepped portions 114 of a predetermined depth, each of the stepped portions 114 being formed on an inner circumferential surface of the pipe joining hole 111 in order to enhance joining strength between the pipe 120 and the flange 110.

A plurality of the stepped portions 114 are formed on at least one of the arc-shaped portion 113 and the linear slant portion 112 in a circumferential direction in a state where they are spaced apart from each other at regular intervals.

Here, the stepped portions 114 may be formed on the arc-shaped portion 113 or the linear slant portion 112, or formed within a range from the arc-shaped portion 113 to the linear slant portion 112 as shown in the drawings. In this instance, the stepped portions 114 ranging from the arc-shaped portion 113 to the linear slant portion 112 are formed in an insertion direction of the pipe 120 inserted into the pipe joining hole 111.

As shown in FIGS. 6 to 8, the stepped portions 114 may be formed in such a way as to have an approximately "U"-shaped section, or as shown in FIG. 9, in such a way as to have a "V"-shaped section by processing serrations on the inner circumferential surface of the pipe joining hole 111.

Accordingly, when the pipe 120 are joined to the pipe joining hole 111 via the cocking work, the outer surface of the pipe-expanded portion 121 of the pipe 120 fills the inside of the stepped portions 114 while being inwardly compressed to the inside of the stepped portions 114, such that the joining strength between the pipe 120 and the flange 110 increases, whereby it can prevent the rotation of the pipe 120 better.

Furthermore, the stepped portions 114 are gradually reduced in depth toward the end portion of the linear slant portion 112 adjacent to the sealing member 130.

In other words, the process of filling the inside of the stepped portions 114 with the outer surface of the pipe-expanded portion 121 of the pipe 120 and the process of molding the sealing member seating portion 122 on the end portion of the pipe-expanded portion 121 are carried out simultaneously. In this instance, if the stepped portions 114 adjacent to the sealing member 130 are too deep, it is difficult to mold the sealing member seating portion 122 and processing accuracy is deteriorated.

When the pipe-expanded portion 121 of the pipe 120 is molded, deformation of the pipe 120 increases toward the end portion of the pipe-expanded portion 121, and in this instance, if the stepped portions 114 are too deep, the components may be damaged when the pipe 120 and the flange 110 are joined with each other.

Accordingly, the stepped portions 114 are gradually reduced in depth toward the end portion of the linear slant portion 112 adjacent to the sealing member 130, such that the sealing member seating portion 122 can be easily molded and the processing accuracy of the sealing member seating portion 122 is easily secured.

In the meantime, FIG. 10 illustrates the linear slant portion 112 of the flange 110 and the pipe-expanded portion 121 of the pipe 120, which are formed in a non-circular shape in order to prevent the rotation of the pipe 120 much better. That is, FIG. 10 is a view taken along the line of A-A of FIG. 5. Of course, even though the linear slant portion 112 of the flange 110 and the pipe-expanded portion 121 of the pipe 120 are formed in a circular shape, it can secure a sufficient joining strength due to an increase of the contact area to thereby prevent the rotation of the pipe 120, however, if the linear slant portion 112 and the pipe-expanded portion 121 are formed in the non-circular shape, it can perfectly prevent the rotation of the pipe 120.

Furthermore, as shown in FIG. 10, sections of the linear slant portion 112 and the pipe-expanded portion 121 can be formed in an oval shape, or in one of various non-circular shapes.

FIG. 11 illustrates a pair of rotation-preventing ribs 116 projectingly formed on one side of the flange 110 to support both sides of the pipe 120, such that the function to prevent the rotation of the pipe 120 can be reinforced more.

Hereinafter, actions of the pipe connection joint 100 according to the present invention will be described.

First, the flange 110 is manufactured through Al-diecasting, and the pipe 120 is bent in an L-shape using micro R bending technology.

After that, one end portion of the pipe 120 bent in an L-shape is inserted into the pipe joining hole 111, and then, joined thereto through the cocking work by the press.

In other words, the end portion of the pipe 120 inserted into the pipe joining hole 111 is expanded by the press to form the tapered-form pipe-expanded portion 121, and then, compressed to the linear slant portion 112 of the pipe joining hole 111.

In this instance, in case that the stepped portions 114 are formed on the inner circumferential surface of the pipe joining hole 111, the outer surface of the pipe-expanded portion 121 fills the inside of the stepped portions 114 to thereby enhance the joining strength more.

After that, the end portion of the pipe-expanded portion 121 projecting outwardly from the flange 110 is shrunk inwardly, such that the sealing member seating portion 122 is molded thereon, and then, the end portion of the pipe 120 is expanded again, and thereby, the cocking work is finished.

After the O-ring, which is the sealing member, is seated on the sealing member seating portion 122, in a state where the end portion of the pipe 120 projecting outwardly from the flange 110 is connected to the passage 2 of the connection object 1, the bolt 140 is fastened to the bolt hole 115 of the flange 110 and the bolt tap 4 of the connection object 1, such that the joining between the pipe connection joint 100 and the connection object 1 is finished.

While the present invention has been described with reference to the particular illustrative embodiment, it is not to be restricted by the embodiment but only by the appended claims. It is to be appreciated that those skilled in the art can change or modify the embodiment without departing from the scope and spirit of the present invention.

What is claimed is:

1. A pipe connection joint comprising:
   a flange joined to a connection object having a passage for a flow of fluid and a pipe joining hole penetratingly formed on the flange, the pipe joining hole having a linear slant portion widening toward the connection object; and
   a pipe bent in an L-shape and inserted into the pipe joining hole of the flange, the pipe having a pipe-expanded portion expandably formed on the pipe along the linear slant portion to thereby be closely joined to the linear slant portion of the pipe joining hole, the pipe being connected to the passage of the connection object in a state where a sealing member is seated on an outer surface of one end portion of the pipe;
   the pipe joining hole further comprises:
   an arc-shaped portion formed on one end portion thereof with a radius in such a way as to be in contact with an inwardly-curved surface portion of the pipe; and the linear slant portion extending from the arc-shaped portion to another end portion thereof and being, inclined at a angle in such a way as to be in contact with the pipe-expanded portion of the pipe, and wherein a plurality of stepped portions of a depth are formed on an inner circumferential surface of the pipe joining hole so that an exterior circumferential surface of the pipe-expanded portion filled in and compressively joined to the inside of the stepped portion to thereby enhance the joining strength between the pipe and the flange.

2. The pipe connection joint according to claim 1, wherein a sealing member seating portion adapted for seating a sealing member thereon is formed on an end portion of the pipe-expanded portion in an inwardly shrunk manner.

3. The pipe connection joint according to claim 2, wherein an outer diameter of the sealing member seating portion is equal to or smaller than an inner diameter of an end portion of the pipe joining hole adjacent to the sealing member seating portion.

4. The pipe connection joint according to claim 2, wherein an outer diameter of an end portion of the pipe-expanded portion of the pipe adjacent to the sealing member is equal to or smaller than the inner diameter of the end portion of the pipe joining hole adjacent to the sealing member seating portion.

5. The pipe connection joint according to claim 1, wherein the pipe-expanded portion is formed between an end portion of an inwardly-curved surface portion of the pipe bent in an L-shape and the sealing member.

6. The pipe connection joint according to claim 1, wherein the stepped portions are formed on at least one of the arc-shaped portion and the linear slant portion.

7. The pipe connection joint according to claim 1, wherein the stepped portions are gradually reduced in depth toward the end portion of the linear slant portion adjacent to the sealing member.

8. The pipe connection joint according to claim 1, wherein the stepped portions are formed on the inner circumferential surface of the pipe joining hole by processing serrations thereon, and the pipe-expanded portion is compressively joined to the serrations to thereby prevent rotation of the pipe.

9. The pipe connection joint according to claim 1, wherein the linear slant portion and the pipe-expanded portion are formed in a non-circular shape in order to prevent the rotation of the pipe.

* * * * *